United States Patent [19]

Gray

[11] Patent Number: 4,594,826

[45] Date of Patent: Jun. 17, 1986

[54] FIELD-ASSEMBLED RACEWAY FORMING MEMBER

[75] Inventor: Charles R. Gray, Coraopolis, Pa.

[73] Assignee: H. H. Robertson Company, Pittsburgh, Pa.

[21] Appl. No.: 623,709

[22] Filed: Jun. 22, 1984

[51] Int. Cl.[4] .............................................. E04B 5/48
[52] U.S. Cl. .................................... 52/221; 52/126.2; 174/48
[58] Field of Search ................ 52/220, 221, 450, 336, 52/451, 674, 329, 126.2; 174/48, 49

[56] References Cited

U.S. PATENT DOCUMENTS

| | | | |
|---|---|---|---|
| 1,266,574 | 5/1918 | Ford | 52/450 |
| 2,077,513 | 4/1937 | Buttress | 52/451 |
| 2,090,483 | 8/1937 | Mendez | 52/336 |
| 2,912,848 | 11/1959 | Lee et al. | 72/16 |
| 3,397,497 | 8/1968 | Shea et al. | 52/334 |
| 3,459,875 | 8/1969 | Fork | 174/97 |
| 3,592,956 | 7/1971 | Fork | 174/49 |
| 3,812,636 | 5/1974 | Albrecht et al. | 52/334 |
| 4,194,332 | 3/1980 | Fork | 52/220 |
| 4,454,692 | 6/1984 | Ault | 52/451 |

FOREIGN PATENT DOCUMENTS

| | | | |
|---|---|---|---|
| 278186 | 10/1927 | United Kingdom | 52/674 |
| 776607 | 6/1957 | United Kingdom | 52/329 |

Primary Examiner—James L. Ridgill, Jr.
Attorney, Agent, or Firm—G. E. Manias

[57] ABSTRACT

A raceway forming member for use with a cellular or non-cellular flooring unit having at least two longitudinal, spaced-apart, inverted channels connected by a web to define a trough therebetween. The raceway forming member comprises a longitudinal cover element sized to span the trough at a selected upper point of said channels and having edge means adapted to abut said channels, and at least one longitudinal separator member depending from and coextensive in length with said cover element to define at least two cell raceway.

10 Claims, 10 Drawing Figures

FIELD-ASSEMBLED RACEWAY FORMING MEMBER

BACKGROUND OF THE INVENTION

1. Field of the Invention:

This invention relates to wire distribution flooring units for building floors, and more particularly, to a raceway forming member for converting the trough of a cellular or non-cellular flooring unit into at least two electrical raceways.

2. Description of the Prior Art:

The use of cellular and non-cellular metal flooring units in the construction of composite building floors is well known. See for example U.S. Pat. No. 3,812,636 (Albrecht et al), which describes a non-cellular profiled metal flooring unit having longitudinally inverted channels, with valleys or troughs disposed therebetween. The flooring unit is adapted to support an overlying layer of concrete to coact compositely. A metal cellular flooring unit differs in that it is provided with a lower metal sheet secured to the profiled upper metal sheet along contiguous portions thereof which cooperates with the inverted channels to form cells. Such metal cellular flooring units are shown in U.S. Pat. Nos. 3,812,636 (Albrecht et al), 3,397,497 (Shea et al), and 3,459,875 (Fork). The cells of a cellular flooring unit have been used to distribute electrical services, such as telephone, electrical power and the like to various locations in a floor.

It is also known that a trough of the cellular or non-cellular flooring unit may be capped to convert the trough into an electrical raceway. See for example U.S. Pat. Nos. 2,912,848 (Lee et al), 3,592,956 (Fork), and 4,194,332 (Fork). Typically, the capping of the trough and/or the positioning therein of inserts provides only a single raceway through which high voltage electrical wiring or low voltage single carrying wiring may be distributed.

A field-assembled cellular flooring unit is known wherein the trough of a non-cellular corrugated flooring unit presenting two inverted channels, receives a U-shaped element which divides the trough into three upright channels. A capping arrangement including alternating cover plates and preset access housings, caps the trough and converts the upright channels into enclosed raceways, see Bowman Construction Products advertisement appearing in the July 1983 issue of "Building Design & Construction" at pages 145–148.

SUMMARY OF THE INVENTION

Accordingly, it is an object of the present invention to provide a raceway forming member which divides the trough formed by and between the inverted channels of cellular and non-cellular flooring units into at least two raceways thereby to create a low cost electrical wiring distribution unit.

A further object of this invention is to provide an electrical/telecommunication distribution raceway system which utilizes only the flooring units, either cellular or non-cellular and field-installable raceway forming member.

A still further object of the invention is to provide a raceway forming member of generally inverted hat-shaped configuration which is coextensive in length with the flooring unit which eliminates the need for and the installation procedure of preset access housings.

The present invention provides a raceway forming member for use with cellular or non-cellular flooring units having at least two longitudinally extending inverted channels separated by a trough therebetween. The raceway forming member comprises a longitudinal cover element substantially coextensive in length with the flooring unit and having a width at least substantially the same as the trough. The cover element may comprise a single elongated piece or multiple pieces assembled in end-to-end relation. The cover element includes edge means adapted to engage the respective side walls or crests of the inverted channels. The cover elements caps the trough to form a lengthwise duct. The raceway forming member also includes a separator member depending from the cover and adapted to divide the duct into at least two raceways.

In one embodiment of this invention, the cover element has a hat-shaped profile including an upper wall, depending side walls, and outwardly extending flanges. The hat-shaped cover element is placed over the trough with the flanges secured to the crests of the inverted channels, and converts the same into an elongated duct. The upper wall of the hat-shaped cover element may be provided with access openings which are protected by knock-out pans against ingress of concrete. Alternatively, openings in the form of knock-out may be provided which allow the workmen to select those openings which are to be activated after pouring and curing of the overlying layer of concrete. A vertical separator member may be installed in the duct to divide the same into separate raceways. Alternatively, a hat-shaped insert may be inserted into the trough which cooperates with the web to form an enclosed raceway and which divides the duct into three separate raceways. The hat-shaped cover element eliminates the need for and the cost of installing presently used preset access housings.

In one embodiment of the invention, the separator member comprises and L-shaped member having a longitudinal vertical leg adapted to connect to the cover plate, and a bottom portion adapted to rest on the bottom of the trough. In a further preferred embodiment, the separator member is integrally formed with the cover element and has a lower edge adjacent to the bottom of the trough. In both cases, the separator member divides the thus-formed duct into at least two raceways and also provides support for the cover element when pouring the overlying layer of concrete.

It is also contemplated by the present invention to provide a plurality of separator members to provide more than two raceways within the trough.

BRIEF DESCRIPTION OF THE DRAWINGS

Other objects and advantages of the present invention will become apparent from the following detailed description of the preferred embodiments by reference to the accompanying drawings in which:

FIG. 6 a fragmentary perspective view of a non-cellular flooring unit incorporating a hat-shaped raceway forming member;

DESCRIPTION OF THE PREFERRED EMBODIMENTS

Figure 1:
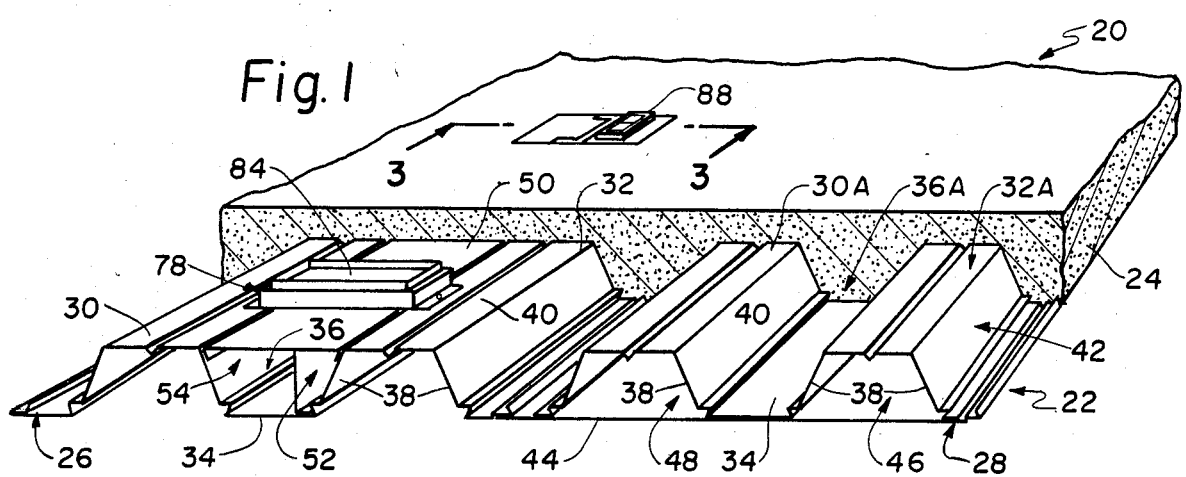
FIG. 1 is a fragmentary perspective view of a floor structure wherein a raceway forming member of the present invention is incorporated into a non-cellular/cellular flooring unit of a metal subfloor.

FIG. 1 illustrates an electrical wiring distributing floor structure 20 comprising a metal subfloor 22 and an overlying layer of concrete 24. The metal subfloor 22 is assembled from plural distribution or flooring units including non-cellular or corrugated flooring units 26 and cellular flooring units 28. It will be understood that depending upon the electrification requirements of the floor structure 20, the metal subfloor 22 may comprise plural non-cellular and cellular flooring units 26, 28, respectively, comingled as shown in FIG. 1; or may consist of only the non-cellular flooring units 26 or of only the cellular flooring units 28.

The non-cellular flooring unit 26 includes first and second spaced-apart, inverted, longitudinal channels 30, 32 connected by a web 34 which forms a trough 36 therebetween. Each of the channels 30, 32 includes side walls 38 connected by a crest 40. The trough 36 includes confronting ones of the side walls 38 connected by the web 34.

The cellular flooring unit 28 includes a corrugated upper metal sheet 42 presenting first and second spaced-apart, inverted, longitudinal channels 30A and 32A, connected by a web 34 which forms a trough 36A therebetween. Each of the channels 30A, 32A include side walls 38 connected by a crest 40. The trough 36A includes confronting ones of the side walls 38 joined by the web 34. Additionally, a correlative lower metal sheet 44 is secured to the upper metal sheet 42 along contiguous portions thereof and cooperates with the channels 30A and 30B to form enclosed cells or raceways 46,48.

Referring still to FIG. 1, a raceway forming member 50 is positioned to fit within the trough 36 to provide first and second raceways 52, 54. In a similar manner, the raceway forming member 50 could be positioned within the trough 36A of the cellular flooring unit 28 to provide additional raceways.

Figure 2:
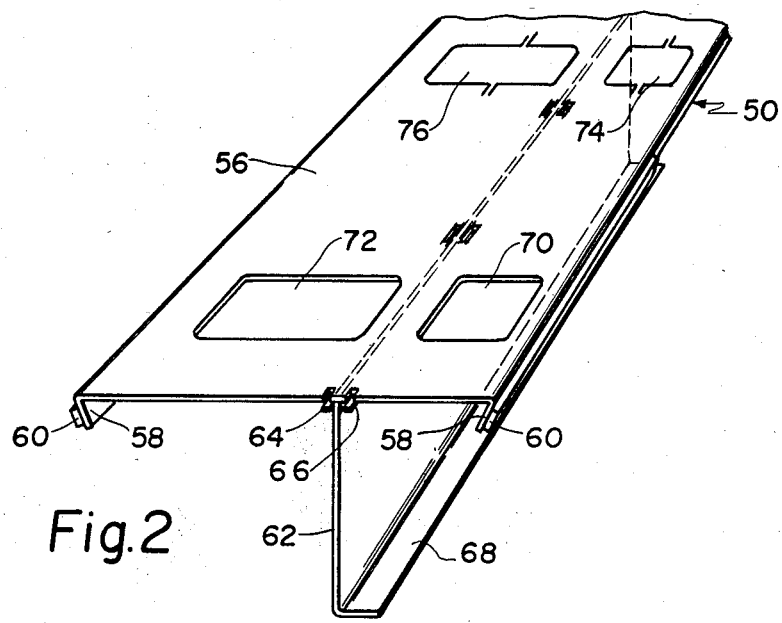
FIG. 2 is a fragmentary perspective view of the raceway forming member shown in FIG. 1.
Figure 3:
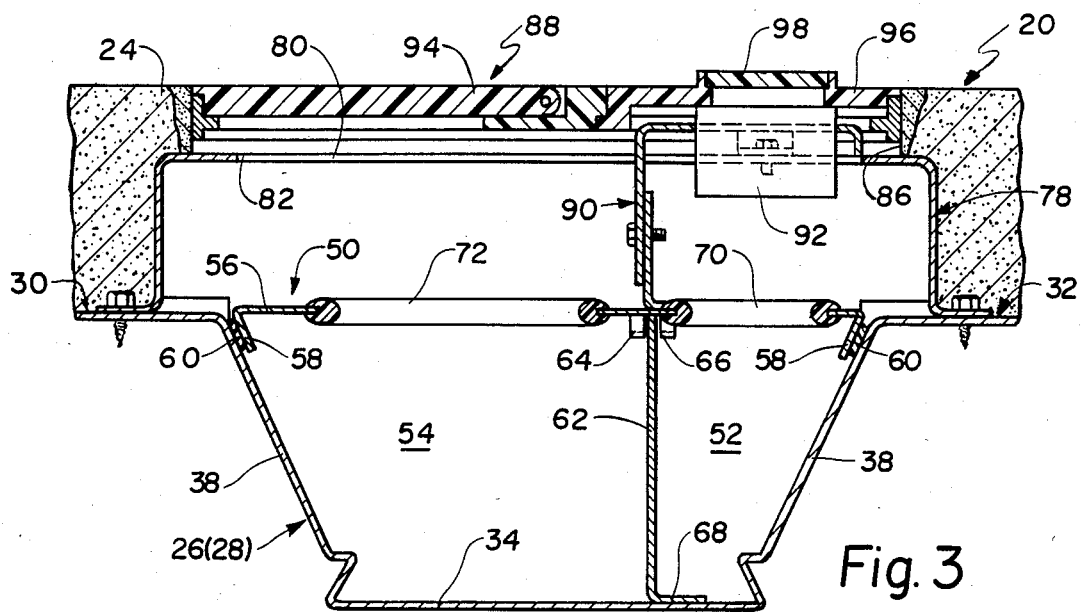
FIG. 3 is a cross-sectional view taken along the line 3—3 of FIG. 1.

As shown in FIGS. 2 and 3, the raceway forming member 50 comprises an elongated cover element 56 including edge means, e.g., flanges 58 which are adapted to be positioned adjacent to the confronting side walls 38 of the inverted channels 30, 32. Preferably, each of the flanges 58 is substantially parallel with the adjacent side wall 38. Also, it is preferred that each edge means 58 includes a gasket 60 extending the length thereof and which is compressed between the edge means 58 and the adjacent side wall 38.

The raceway forming member 50 also includes a longitudinal separator member 62 depending from the cover element 56 to the web 34. The separator member 62 may be welded to the cover element 56 or, as shown, may have its upper edge captively retained between depending flanges 64, 66 to provide a friction grip and to permit field assembly and ease of shipment of the raceway forming member 50. Also as shown, the longitudinal separator 62 includes a base portion 68 adapted to rest on the web 34 and to be secured thereto by attachment means, such as spot welding. The base portion 68 facilitates field assembly of the separator 62 by allowing the separator 62 to rest upright on the web 34 so as to receive the cover 56.

As shown in FIG. 2, the cover element 56 may be provided with factory punched access openings 70, 72 which may be grommeted, as shown in FIG. 3, to provide access to the raceways 52, 54. Alternatively, the cover 56 may be provided with knock-outs 74, 76 which may be removed in the field. As shown in FIGS. 1 and 3, an access housing 78 is secured to the channels 30, 32 in overlying relation with the access opening 70, 72. The top wall 80 of the housing 78 is provided with an outlet opening 82. As shown in FIG. 1, a knock-out pan 84 is secured to the top wall of the housing to protect the outlet opening against ingress of the concrete 24. When a selected housing 78 is to be activated, the concrete above the pan 84 is broken; the broken concrete and the pan 84 are removed; and a passageway 86 (FIG. 3) is formed in the concrete 24. Suitable closure means 88 is installed in the passageway 86 for gaining access to the interior of the housing 78.

As shown in FIG. 3, a suitable carrier 90 is installed within the housing and supports a duplex or triplex receptacle 92 adjacent to the upper surface of the concrete 24. The closure means 88 includes a removable cover 94 for gaining access to the raceway 54 through the access opening 72; and a fixed cover 96 having a removable cap or caps 98 for gaining access to the receptacle 92.

Figure 4:
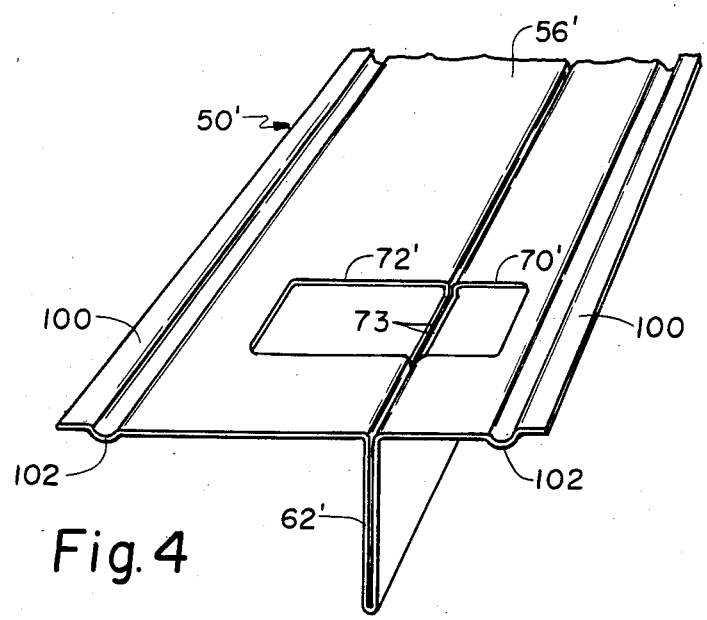
FIG. 4 is a fragmentary perspective view of a further embodiment of the raceway forming member.
Figure 5:
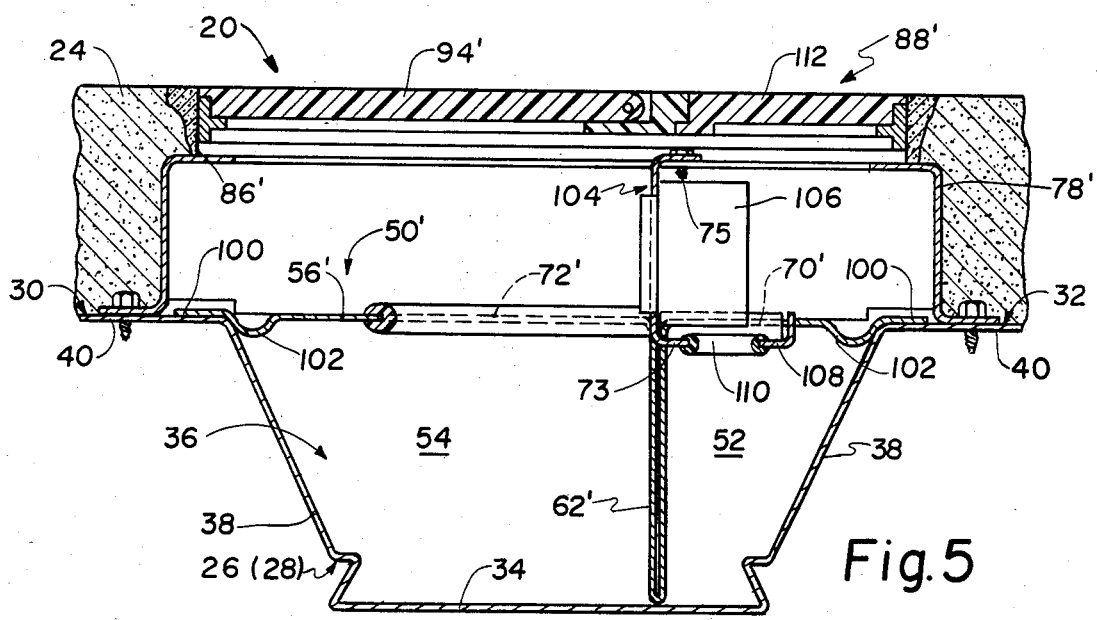
FIG. 5 is a cross-sectional view, similar to FIG. 3, illustrating the raceway forming member of FIG. 4 installed in the trough of a non-cellular flooring unit.

FIG. 4 illustrates another embodiment of a raceway forming member 50' having the separator member 62' formed as an integral part of the cover portion 56'. Edge means 100 are adapted, as shown in FIG. 5, to rest on the crests 40 of the inverted channels 30, 32 and to be secured thereto by suitable attachment means, such as tack welding. Longitudinal grooves 102 provided adjacent to the edge members 100, tangentially abut the side walls 38 and serve to align the raceway forming member 50' with the trough 36. Access opening 70', 72' are provided in the cover portion 56'. The openings 70', 72' are so formed that adjacent edge portions thereof are presented in the separator element 62' and form shoulders 73 adapted to support a receptacle carrier. The access opening 72' is grommeted as shown in FIG. 5 and provides access to the raceway 54. The access housing 78' overlies the openings 70', 72' as explained above. When the housing 78' is activated, a carrier 104 is inserted into the housing and is secured to the top wall 80 by fasteners 75. The housing 104 supports a duplex or triplex receptacle 106. The carrier 104 has a bottom portion 108 extending downwardly through the access opening 70', supported on the shoulders 73, and which is provided with an access opening 110 for access to the raceway 52. When the housing 78' is activated, suitable closure means 88' close off the passageway 86' in the concrete 24. The closure means 88' includes a removable cover 94' for gaining access to the raceway 54 and a removable cover 112 for gaining access to the interior of the housing 78' for wiring the receptacle 106.

Further alternative embodiments of the present invention are illustrated in FIGS. 6-10 wherein corresponding numerals are employed to identify corresponding parts heretofor described.

In a further embodiment illustrated in FIG. 6, a cover element 114 is provided having a hat-shaped profile including an upper wall 116 vertically spaced-apart from the crests 40 of the inverted channels 30, 32, depending side walls 118 and outwardly extending flanges 120 secured to the crests 40 by any suitable attachment means. The cover 114 functions simultaneously as the cover of the raceway forming member 50" and as a continuous preset access housing thereby eliminating the need for the separate, spaced-apart preset access housing 78, 78' described in connection with the embodiments illustrated in FIGS. 3 and 5. The raceway forming member 50' includes the vertical separator member 62 which divides the trough 34 into separate but now enlarged raceways 52', 54'. It will be appreciated that additional storage space for electrical, telephone, CRT and other service connectors would be provided in the upper portion of the raceways 52', 54'. The lower portions of the raceways 52', 54' would continue to function as wireways for the various services.

The upper wall 116 may be provided with factory punched access opening 122 for gaining access to the raceways 52', 54'. The access openings 122 would be capped by a knock-out pan 124 as explained above. Alternatively, the upper wall 116 may be provided with knockouts 126. The access openings 122 or the knockouts 126 can be provided at any desired spacing in the cover element 114.

Figure 7:
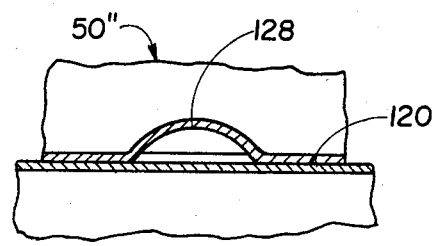
FIG. 7 is a cross-sectional view taken along the line 7—7 of FIG. 6.
Figure 8:
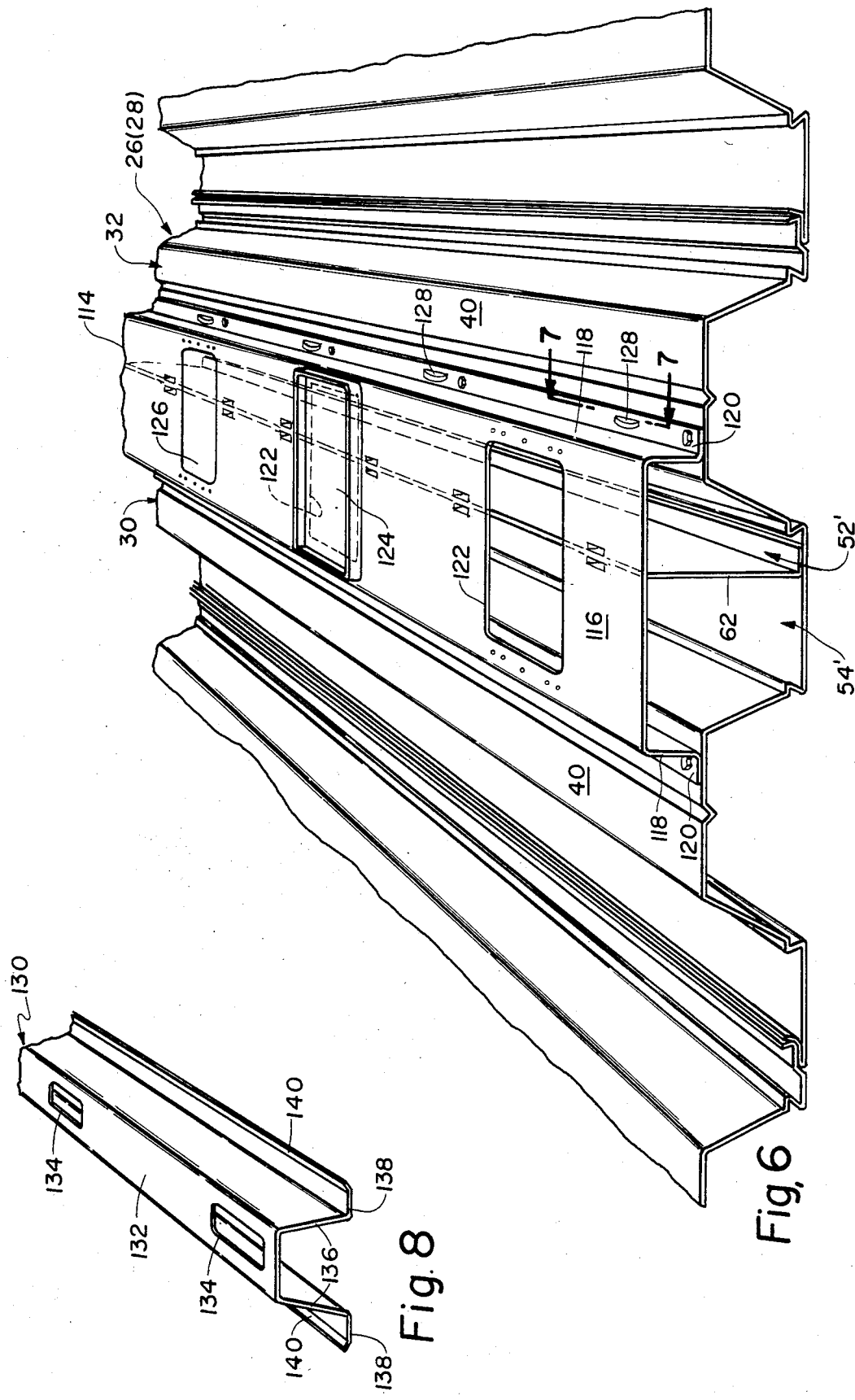
FIG. 8 is a fragmentary perspective view of a hat-shaped insert.

As shown in FIGS. 6 and 7, the flanges 120 are provided with up-punched loops 128 preferably at uniformed spacing along the length thereof. The loops 128 enhance the composite coaction between the overlying layer of concrete and the flooring unit 26.

Figure 9:
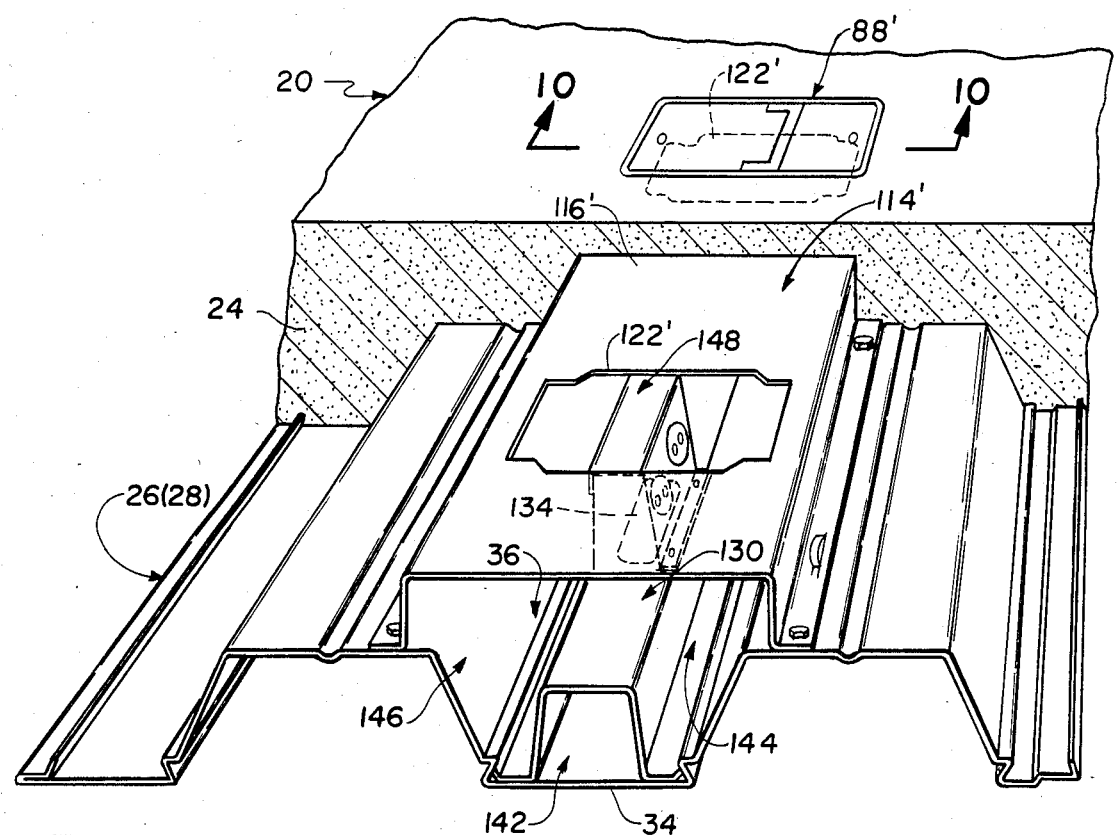
FIG. 9 is a fragmentary perspective view of a floor structure incorporating a hat-shaped raceway forming element and the hat-shaped insert of FIG. 9.

In a further alternative embodiment, a hat-shaped insert 130 (FIG. 8) is employed, comprising a top wall 132 provided with access openings 134, depending side walls 136, and upwardly extending flanges 138 terminated in upturned edges 140. As shown in FIG. 9, the insert 130 is installed in the trough 36 and cooperates with the web 34 to form an enclosed raceway 142. The insert 130 divides the trough 36 into separate raceways 144, 146.

Figure 10:
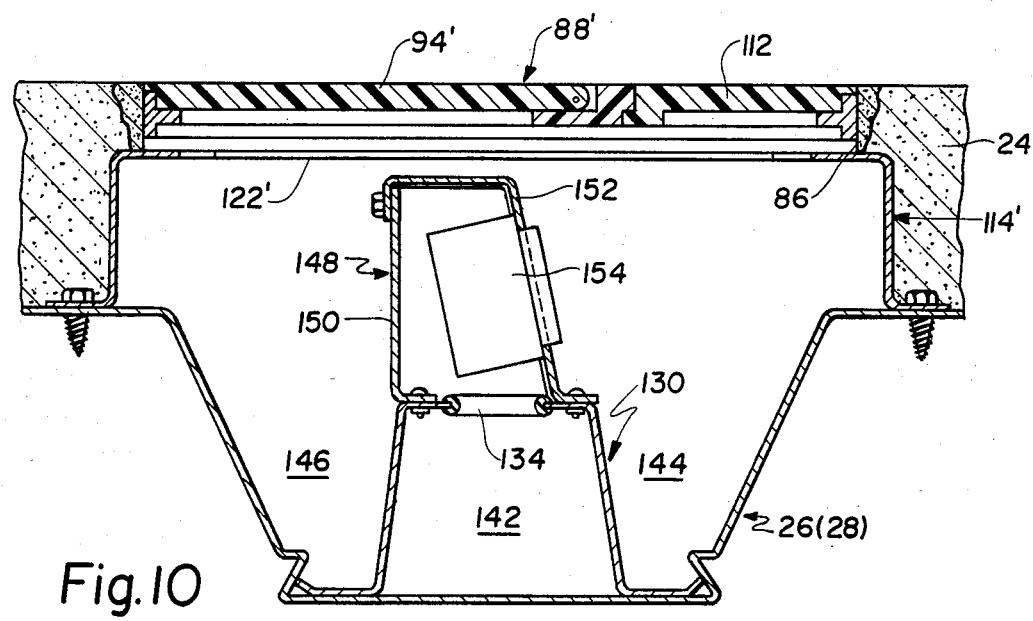
FIG. 10 is a cross-sectional view taken along the line 10—10 of FIG. 9.

As shown in FIG. 9, the upper wall 116' of the cover desired spacing along the length thereof. A totally enclosed element 114' is provided with outlet openings 122' at any housing 114 is inserted through the access opening 122' and is secured to the insert 130 in covering relaion with the grommeted access opening 134. As best shown in FIG. 10, the housing 148 includes a first portion 150 providing the back and two sides of the housing 148 and a second portion 152 providing the front and top of the housing 148. The second portion 152 supports a duplex or triplex receptacle 154. The outlet opening 134 provides communication between the raceway 142 and the interior of the housing 148 for wiring connected to the receptacle 154.

Referring to FIG. 9, each of the access openings 122' would receive a knock-out pan which is removed during activation as explained above. The two-piece housing 148 is inserted through the access opening 122' and secured to the insert 130 in the manner illustrated in FIG. 10. Thereafter suitable closure means, such as the closure means 88' described above is installed in the passageway 86 presented by the concrete 24. The removable cover 94' provides access to the raceway 144 and to the receptacle 154.

Although the invention has been described in detail for the purposes of illustration only, it is to be understood that such detail is solely for that purpose and that variations can be made by those skilled in the art without departing from the spirit and scope of the invention except as it may be limited by the claims.

I claim:

1. An electrical wiring distributing floor structure comprising a metal subfloor and an overlying layer of concrete, said metal subfloor including:
   a distribution unit comprising at least first and second longitudinal, spaced-apart inverted channels presenting spaced crests, said channels being connected by a web positioned therebetween and joining said channels to form a trough; and
   a raceway forming member comprising:
   a cover member substantially coextensive in length with said channels and at least coextensive in width with said trough, said cover member including edge means adapted to engage said first and second channels, said cover member having a hat-shaped transverse profile, being disposed above the level of said spaced crests, and providing a housing substantially coextensive in length with said trough.

2. The floor structure as defined in claim 1 wherein said cover member is provided with outlet openings spaced along the length thereof and wherein preset access housings are secured to the cover member in overlying relation with said access openings to provide access to said raceways.

3. The floor structure as defined in claim 1 including a hat-shaped insert residing within said trough, engaging said web and dividing said trough into said two raceways, said insert cooperating with said web to define a third raceway.

4. The floor structure as defined in claim 1 including at least one separator member substantially coextensive in length with the cover member, connected thereto and depending therefrom into said trough, said separator having a depth at least substantially the same as the depth of said trough and dividing said trough into at least two raceways.

5. The floor structure as defined in claim 4 wherein said separator member is L-shaped including a base adapted to rest upon said web.

6. A raceway forming member in cooperation with either cellular or non-cellular flooring units having first and second longitudinal, spaced-apart inverted channels presenting spaced crests, said channels being connected by a web positioned therebetween and joining said channels forming a trough, said member comprising:
   a cover member substantially coextensive in length with said channels and at least coextensive in width with said trough, said cover member including edge means adapted to engage said first and second channels, said cover member comprising an elongated hat-shaped member disposed above the level of said spaced crests and providing an access housing substantially coextensive in length with said trough.

7. The raceway forming member as defined in claim 6 wherein outlet openings are provided in said cover member and wherein preset access housings are secured to the cover member in covering relation with said outlet openings to provide access to said raceways.

8. The raceway forming member as defined in claim 6 including a hat-shaped insert residing within said trough, engaged with said web and dividing said trough into said two raceways, said insert cooperating with said web to define a third raceway.

9. The raceway forming member as defined in claim 6 including at least one separator member substantially coextensive in length with the cover member, connected thereto and depending therefrom into said trough, said separator having a depth at least substantially the same as the depth of said trough and dividing said trough into at least two raceways.

10. The raceway forming member as defined in claim 9 wherein said separator member is L-shaped including a base adapted to rest upon said web.

* * * * *